United States Patent Office 3,106,474

Patented Oct. 8, 1963

3,106,474

VITREOUS CERAMIC COMPOSITIONS

Ernest R. Glabau, Monroe, Conn., assignor to Vitramon, Incorporated, Monroe, Conn., a corporation of Delaware

No Drawing. Filed July 26, 1961, Ser. No. 126,900
4 Claims. (Cl. 106—53)

The present invention relates to novel ceramic compositions and more particularly to novel glass compositions having exceptionally stable electrical properties.

Ceramic compositions based upon silicon dioxide are finding more widespread use in the electronics industry today than ever before and, in view of the ever increasing complexities of modern electronic equipment, ceramic compositions having electrical properties heretofore thought to be unattainable are in constant demand.

In the past, ceramic compositions have been developed in an effort to reduce the amount of power lost when such compositions, in the form of electrical capacitors or the like, are exposed to an applied voltage. An important characteristic of a capacitor is the ratio of resistance to reactance. This ratio is termed dissipation factor, and its reciprocal is the storage factor, or Q. Dissipation factor is directly proportional to the energy dissipated while storage factor is proportional to the energy stored per cycle. When a ceramic dielectric body is placed in an alternating electric field, it transforms part of the electrical energy into heat. This power loss may be considered to take place in a fictitious shunt or series resistance, depending upon the material, the applied field frequency and the temperature. For dissipation factors less than .1, the difference between the representation as shunt or series resistance is very small and the dissipation factor may be considered to be unaffected.

Vitreous ceramic compositions are known in which the initial dissipation factor is in the order of .0005 at room temperature and prior to any voltage-temperature stressing, compositions of this type being taught for instance by U.S. Patent 2,413,549. It has been found that these initial characteristics are not determining factors as to whether the ceramic dielectric has useful properties. The dissipation factor of ceramic materials tends to increase substantially as its temperature is raised to 125° C. This degradation, with its accompanying increase in loss, renders such ceramic bodies inferior for specialized applications where extreme conditions of heat are encountered.

It has also been found that for extended periods of voltage-temperature stress, the conventional ceramic degrades extensively. Thus, for electrical components manufactured from these materials and utilized at high temperatures, the mean-time-to-failure may be quite short; this necessitates either derating of the component or frequent replacement. Both are considered to be unduly expensive.

Any dielectric material has a property known as its dielectric constant; this is the ratio of the capacitance of an electrode system using the material as a dielectric to its capacitance with a vacuum dielectric. The higher the dielectric constant of a material, the greater will be the capacitance resulting from a given electrode configuration, and the greater will be its ability to store electrical energy. The capacitance of components made from conventional ceramic materials tends to vary considerably as the temperature of the component varies from −55° C. to 125° C. This may render such components useless or undependable for use in capacitors which are incorporated into electrical systems which must operate at extreme temperatures of heat or cold.

It is an object of this invention to prepare vitreous compositions which have a low dissipation factor at room temperature, and which retain this characteristic at temperatures in the order of 125° C., even after extended periods with voltage-temperature stresses applied.

It is another object of this invention to prepare vitreous ceramic compositions having a dielectric constant which is essentially constant over a wide range of temperatures, so that a capacitor made from this material will not decrease in capacitance more than 1% as the ambient temperature is reduced from room temperature to −55° C., and which will not increase more than 1.3% as the temperature is raised from room conditions to 125° C.

It is an advantage of the present invention that compositions are produced which are stable and uniform and which resist having the alkali content thereof washed out or leached out during processing and which resist the ion migration which causes degradation when the present compositions are subjected to electrical and temperature stresses.

These and other objects and advantages are accomplished as more fully set out hereinafter.

Due to the exceptional progress made by the electronics industry in recent years, and due to the constantly increasing environmental rigors encountered as new vistas are explored, many new and strict requirements have rendered some of the known vitreous compositions obsolete. It is now evident, for instance, that although a vitreous composition may exhibit a low dissipation factor (and thus a low power loss) at room temperatures, it is useless for high temperature applications unless the dissipation factor remains comparatively low at temperatures up to 125° C., and further remains low throughout the period of use. It is with these rigid requirements in mind that the novel compositions of the present invention were developed.

The compositions of the present invention consist essentially of silicon dioxide, lead oxide, a combination of alkali metal oxides consisting essentially of sodium oxide, potassium oxide and lithium oxide; one or more of the oxides of the bivalent metals selected from the group consisting of magnesium, strontium, zinc, barium, calcium and beryllium; an alkali metal fluoride selected from the fluorides of sodium, potassium and lithium; and, if desired, one or more of the oxides of trivalent metals selected from the group consisting of aluminum and boron. Each of the above components except for the trivalent metal oxide is a critical ingredient in the present compositions in that the slightest deviation from this formula gives rise to compositions having completely different and inferior properties. Likewise it has been found that these ingredients may only be used within specific ranges in order to attain the objects of this invention, variations giving rise to dielectrics having excessively high dissipation factors and loss of capacitance stability. Table 1 below sets forth the ingredients and their proportions. The proportion ranges are in terms of gram molecular percentages, as indicated:

TABLE 1

| Ingredient | Broad Molecular Percentage | Preferred Molecular Percentage |
|---|---|---|
| Silica, $SiO_2$ | 40-55 | 44-50 |
| Lead oxide, PbO | 20-30 | 23-27 |
| Alkali metal oxides, $R_2O$ | 5-9 | 5-6 |
| Bivalent metal oxide, RO | 5-15 | 7-11 |
| Alkali metal fluoride, RF | 5-15 | 7-11 |
| Trivalent Metal oxide $R_2O_3$ | 0-5 | 0-4 |

The above table defines the suitable molecular percentages of the various ingredients according to the broad range of proportions which may be used and according to the more limited range of proportions which have been found to be preferred for the production of compositions having exceptional electrical properties.

It has been discovered, according to this invention, that a combination of alkali metal oxides must be used in the present compositions, and that the ratio of these oxides to each other is very critical in producing the vitreous compositions of the present invention. This result is quite unexpected since heretofore, as evidenced by said U.S. Patent 2,413,549, it was felt that materials such as sodium oxide and potassium oxide and mixtures thereof were interchangeable in these types of vitreous compositions, without having any subsantial effect upon the electrical characteristics such as stability of the dissipation factor and degradation thereof with time, temperature and polarized voltage. Vitreous compositions generally have a relatively low maturing temperature and thus usually require a considerable quantity of alkali metal oxide to aid in the fluxing thereof, which oxide is known to decrease the electrical efficiency of the final composition. Consequently it was quite unexpected to find that even though the novel compositions of the present invention require the addition of a considerable quantity of alkali metal oxides, the proportions of these oxides can be varied within certain close limits to produce compositions which have extreme electrical efficiency over a wide temperature range. It has been discovered that when from 5 to 9 mole percent of a mixture of alkali metal oxides is used consisting essentially of and containing at least about 3.3 mole percent of potassium oxide, at least about 0.5 mole percent of sodium oxide and at least about 1.5 mole percent of lithium oxide, the potassium oxide and sodium oxide being present in a molar ratio of from about 4:1 to about 7:1 then the dissipation factor and capacitance of the vitreous composition are greatly improved, at extreme temperatures and even after continued use, to values heretofore thought unattainable with compositions of this type. The following examples are given by way of illustration and should not be construed as limitative:

TABLE 2

*Calculated Composition, Mole Percentages*

| Ingredients | Examples | | | | | | |
|---|---|---|---|---|---|---|---|
| | 1 | 2 | 3 | 4 | 5 | 6 | Prior Art |
| $SiO_2$ | 45.4 | 44.7 | 49.61 | 49.61 | 49.61 | 49.61 | 44.0 |
| PbO | 24.1 | 23.7 | 26.2 | 26.2 | 26.2 | 26.2 | 23.2 |
| $K_2O$ | 5.01 | 4.94 | 3.67 | 3.52 | 3.36 | 3.52 | 2.7 |
| $Na_2O$ | 0.77 | 0.76 | 0.55 | 0.53 | 0.51 | 0.53 | 2.5 |
| $Li_2O$ | 2.39 | 2.36 | 1.74 | 1.67 | 1.60 | 1.67 | 2.3 |
| NaF | 10.83 | 10.67 | 7.97 | 7.62 | 7.28 | 7.62 | 10.4 |
| MgO | 5.43 | 5.34 | 6.68 | 6.40 | 6.12 | 6.40 | 8.7 |
| SrO | 3.94 | 2.04 | 3.57 | 3.42 | 3.27 | 3.47 | 6.2 |
| CaO | -------- | 1.74 | -------- | -------- | -------- | -------- | -------- |
| $Al_2O_3$ | 2.08 | 3.58 | -------- | 1.00 | 2.00 | -------- | -------- |
| $B_2O_3$ | -------- | -------- | -------- | -------- | -------- | 1.00 | -------- |

The vitreous ceramic compositions of the present invention are produced by weighing, dry blending and then fritting in a fire clay crucible a suitable batch formulation containing or generating the reagents listed in the foregoing examples in the amounts given. The various reagents such as the oxides may be added to the batch composition stoichiometrically in the form of their carbonates or nitrates, etc. for purposes of cost, stability and convenience.

The homogeneous molten vitreous compositions are fritted by pouring them into water, whereby solid particles or granules are produced. Next these particles or granules are ground into a fine powder which is heated to a temperature of about 450° F. for a period of about one hour to prepare them for subsequent use in the production of electrical components such as capacitors and the like.

The dissipation factors of the vitreous compositions of the present invention were compared to the corresponding properties of a typical prior art composition as identified in Table 2, said composition being the one identified as "A" in Table III of aforementioned U.S. Patent 2,413,549.

This was accomplished by forming dielectric sheet capacitors of the various compositions according to the procedure outlined in U.S. Patent No. 2,779,975 to Lee et al.

The dissipation factors were determined for each of the various capacitors over a temperature range of from 25° C. to 125° C. In addition, the capacitors were subjected to rigid testing for 72 hours at 200° C. under a voltage stress of 50 volts. The dissipation factors were again determined at 25° C. after the life testing. The results are set forth in Table 3 below:

TABLE 3

| Examples | Capacitance at 25° C. | DF at 25° C. | DF at 125° C. | DF at 25° C. after life testing |
|---|---|---|---|---|
| 1 | 378.9 | .00035 | .00220 | .00050 |
| 2 | 400.7 | .00020 | .00203 | .00055 |
| 3 | 447.1 | .00032 | .00080 | .00035 |
| 4 | 472.1 | .00030 | .00093 | .00030 |
| 5 | 428.2 | .00030 | .00110 | .00027 |
| 6 | 481.8 | .00025 | .00085 | .00029 |
| Prior Art | 437 | .0005 | .0050 | .0110 |

As is evident from Table 3, the compositions of the present invention initially have a low dissipation factor or power loss even at a temperature of 125° C., and after 72 hours of rigid life testing at 200° C. the prior art compositions degrade very badly whereas those of the present invention retain an exceptionally low dissipation factor which is in many cases lower than the initial dissipation factor of the prior art composition prior to life testing.

It is not known precisely why the present compositions exhibit electrical properties which are so superior to the prior known compositions which are so similar in formulation. The most important difference in the formulation of the respective compositions resides in the proportion of potassium oxide to sodium oxide. I have found that these exceptional electrical properties are attained only if the potassium oxide is present in molecular percentage equalling or exceeding four times the molecular percentage of the sodium oxide present, and that the best results are obtained when about 6.7 times as much potassium oxide as sodium oxide is used as shown in Example 3 herein.

One reason for the beneficial results arising from such proportions is that the potassium ions, while providing adequate fluxing action, are more strongly bonded in the ceramic than are the more mobile sodium ions. Thus when the present ceramic compositions are subjected to electrical and temperature stresses they exhibit more resistance to the ion migration which causes degradation than do the prior known compositions which are high in sodium ion content as noted by Table 2 which defines the prior art ceramic composition having the best electrical properties heretofore known.

The present invention is not limited to the specific materials listed in Table 2, it being understood that equivalent materials may be substituted. For instance, in place of part or all of the sodium fluoride, there may be used other alkali metal fluorides such as potassium and lithium fluoride. Likewise in place of all or part of the bivalent metal oxides there may be used the oxides of zinc, barium and beryllium. And in place of all or part of the trivalent metal oxides there may be used the oxides of lanthanum and cerium.

Variations and modifications may be made within the scope of the claims and portions of improvements may be used without others.

I claim:

1. A vitreous ceramic composition having a dielectric constant which is stable over a temperature range of —55° C. to 125° C. and having a dissipation factor no greater than 0.001 after the composition is tested at 200° C. under a voltage stress of 50 volts for 72 hours, said composition consisting essentially of the following ingredients in the following approximate mole percentages, 40 to 55% silica, 20 to 30% lead oxide, 5 to 15% bivalent metal oxide, 5 to 15% alkali metal fluoride, 0 to 5% trivalent metal oxide from the group consisting of aluminum oxide, boric oxide, lanthanum oxide and cerium oxide, and 5 to 9% of a mixture of alkali metal oxides consisting essentially of and containing at least about 3.3% of potassium oxide, at least about 0.5% of sodium oxide and at least about 1.5% of lithium oxide, the potassium oxide and sodium oxide being present in a molar ratio of from about 4:1 to about 7:1.

2. A vitreous ceramic composition having a high capacitance value which is stable over a temperature range of —55° C. to 125° C. and having a dissipation factor no greater than 0.001 after the composition is tested at 200° C. under a voltage stress of 50 volts for 72 hours, said composition consisting essentially of the following ingredients in the following approximate mole percentages, 44 to 50% silica, 23 to 27% lead oxide, 7 to 11% bivalent metal oxide, 7 to 11% alkali metal fluoride, 0 to 4% of a trivalent metal oxide from the group aluminum oxide, boric oxide, lanthanum oxide and cerium oxide and 5 to 9% of a mixture of alkali metal oxides consisting essentially of and containing at least about 3.3% of potassium oxide, at least about 0.5% of sodium oxide and at least about 1.5% of lithium oxide, the potassium oxide and sodium oxide being present in a molar ratio of from about 4:1 to about 7:1.

3. A vitreous ceramic composition having a dielectric constant which is stable over a temperature range of —55° C. to 125° C. and having a dissipation factor no greater than 0.001 after the composition is tested at 200° C. under a voltage stress of 50 volts for 72 hours, said composition consisting essentially of the following ingredients in the following approximate mole percentages, 49.6% silica, 26.2% lead oxide, from 9 to 11% bivalent metal oxide, from 7 to 8% alkali metal fluoride, from 3.3 to 3.7% potassium oxide, from 0.5 to 0.55% sodium oxide and from 1.5 to 2% lithium oxide.

4. A vitreous ceramic composition having a dielectric constant which is stable over a temperature range of —55° C. to 125° C. and having a dissipation factor no greater than 0.001 after the composition is tested at 200° C. under a voltage stress of 50 volts for 72 hours, said composition consisting essentially of the following ingredients in the following approximate mole percentages, 49.6% silica, 26.2% lead oxide, 10.3% bivalent metal oxide, 7.9% alkali metal fluoride, 3.67% potassium oxide, 0.55% sodium oxide and 1.7% lithium oxide.

References Cited in the file of this patent

UNITED STATES PATENTS

| | | |
|---|---|---|
| 2,413,549 | Deyrup | Dec. 31, 1946 |
| 2,469,867 | Danzin | May 10, 1949 |

UNITED STATES PATENT OFFICE

CERTIFICATE OF CORRECTION

Patent No. 3,106,474 October 8, 1963

Ernest R. Glabau

It is hereby certified that error appears in the above numbered patent requiring correction and that the said Letters Patent should read as corrected below.

Column 3, TABLE 2, seventh column, line 8 thereof, for "3.47" read -- 3.42 --.

Signed and sealed this 14th day of April 1964.

(SEAL)
Attest:
ERNEST W. SWIDER

Attesting Officer

EDWARD J. BRENNER

Commissioner of Patents